United States Patent [19]
Glezer

[11] Patent Number: 5,761,111
[45] Date of Patent: Jun. 2, 1998

[54] METHOD AND APPARATUS PROVIDING 2-D/3-D OPTICAL INFORMATION STORAGE AND RETRIEVAL IN TRANSPARENT MATERIALS

[75] Inventor: Eli Nathan Glezer, Sommerville, Mass.

[73] Assignee: President and Fellows of Harvard College, Cambridge, Mass.

[21] Appl. No.: 616,426

[22] Filed: Mar. 15, 1996

[51] Int. Cl.$^6$ .................................................. G11C 13/04
[52] U.S. Cl. ........................ 365/106; 365/116; 365/127; 365/215
[58] Field of Search ..................... 365/106, 127, 365/116, 234, 215

[56] References Cited

U.S. PATENT DOCUMENTS

| | | | |
|---|---|---|---|
| 4,466,080 | 8/1984 | Swainson et al. | 365/206 |
| 4,471,470 | 9/1984 | Swainson et al. | 365/127 |
| 5,034,613 | 7/1991 | Denk et al. | 250/458.1 |
| 5,253,198 | 10/1993 | Birge et al. | 365/206 |
| 5,289,407 | 2/1994 | Strickler et al. | 365/206 |
| 5,325,324 | 6/1994 | Rentzepis et al. | 365/206 |

FOREIGN PATENT DOCUMENTS

WO 95/27587  10/1995  WIPO.

OTHER PUBLICATIONS

Bloembergen, "Laser–Induced Electric Breakdown In Solids," IEEE Journal of Quantum Electronics, vol. QE–10, No. 10, pp. 375–386 (1974).
Du et al., "Optical Breakdown In Wide–Band–Gap Materials As a Function of Pulse Duration," Proceeding of UltraFast Phenomena 159–161 (1994).
Du et al., "Laser–Induced Breakdown By Impact Ionization In $SiO_2$ With Pulse Widths From 7 ns To fs," Appl. Phys. Lett., vol. 64, No. 23, 3071–3073 (1994).
Stuart et al., "Laser–Induced Damage In Dielectrics With Nanosecond To Sub–Picosecond Pulses," Phys. Rev. Lett., vol. 74, No. 12, 2248–2251 (1995).
Ihlemann et al., "Nanosecond and Femtosecond Excimer Laser Ablation Of Fused Silica," Appl. Phys. A. 54, 363–368 (1992).
Pronko et al., "Machining Of Sub–Micron Holes Using a Femtosecond Laser At 800 nm," Optics Communications 114 106–110 (1995).
Kuper et al., "Femtosecond UV Excimer Laser Ablation," Appl. Phys. B. 44, 199–204 (1987).
Kuper et al., "Ablation Of UV–Transparent Materials With Femtosecond UV Excimer Laser Pulses," Microelectronic Engineering 9 475–480 (1989).
Soileau et al., "Laser Induced Damage and the Role Of Self–Focusing," Optical Engineering 28 (10), 1133–1143 (1989).

*Primary Examiner*—Tran T. Nguyen
*Attorney, Agent, or Firm*—Albert Peter Durigon

[57] ABSTRACT

Sub-micron-scale, micron-scale and greater than micron-scale, crack-free and regularly-shaped structures of high-contrast refractive index are provided in transparent storage media by controllably focusing ultrashort laser pulses in the bulk of virtually any transparent medium respectively during operation in a "low energy," a "high energy", and a "third" operating regime. In any operating regime, the crack-free and regularly-shaped structures of high-contrast refractive index may be controllably patterned in 2-D or 3-D so as to permanently store both digital and non-digital information in the bulk of the transparent storage medium. For digital-type information, greater than one (1) Terabit, and up to one hundred (100) Terabit, digital information storage capacity in a CD-ROM sized disc is provided. Virtually any non-digital information may be permanently stored therewithin, such as corporate logos, alphanumeric characters, security codes, and artistic images, or diffraction gratings, diffractive optical elements or other optical structures. Information permanently stored in 2-D or 3-D in the bulk of any transparent medium is read by the unaided eye, and by optical microscopy (scattered and transmitted light modes), phase contrast microscopy, laser DIC microscopy and confocal microscopy in dependance on the type of the information and on the operating regime. Information may be written or read in series or in parallel.

45 Claims, 8 Drawing Sheets

METHOD AND APPARATUS PROVIDING 2-D/3-D OPTICAL INFORMATION STORAGE AND RETRIEVAL IN TRANSPARENT MATERIALS

FIELD OF THE INVENTION

This invention is drawn to the field of optical information storage, and more particularly, to novel method and apparatus for providing 2-D/3-D optical information storage and retrieval in transparent materials.

BACKGROUND OF THE INVENTION

Optical information storage technology may be divided into techniques that store information in 2-D, usually on the surface, and into those that store information in 3-D in the bulk, of a storage medium. The read-only CD-ROM, of both the single- and multi-layer varieties, WORM (write-once, read-many) devices, such as discs having a layer of a photoabsorptive material written once by a write laser, and the erasable magneto-optic disc are representative of the heretofore known 2-D optical information storage technology. Dye-impregnated polymers and phase-change media have also been investigated as optical storage media for both WORM optical storage as well as for erasable optical storage.

Bulk (3-D) optical data storage offers the potential for large recording capacity and offers the possibility of parallel read-out. In addition to research in volume holographic data storage, work has been done in point-like binary 3-D optical storage. U.S. Pat. Nos. 4,466,080 and 4,471,470 disclose two or more intersecting beams, and U.S. Pat. No. 5,034,613 discloses a single highly focused beam, to localize the writing and reading of information on 3-D photochromic optical memories via 2-photon excitation. U.S. Pat. No. 5,289,407 discloses optical recording at a density of up to $1.6 \times 10^{12}$ bits/cm$^3$ in a photosensitive photopolymer using 2-photon absorption, where each bit is characterized by less than a one (1) percent change in the local index of refraction and is read out serially with a differential interference contrast (DIC) laser microscope.

SUMMARY OF THE INVENTION

Briefly and in general terms, the present invention enables to controllably produce greater-than micron-scale, micron-scale, and sub-micron-scale crack-free and regularly-shaped structures of altered refractive index in transparent storage media by focusing ultrashort laser pulses in the bulk of virtually any transparent medium, and enables to pattern the same so as to record both digital and non-digital information therewithin. The present invention allows greater than one (1) Terabit digital information storage capacity in a CD-ROM sized disc and enables to permanently record virtually any non-digital pattern, by engraving alphanumeric characters, corporate logos, security codes, artistic images or other non-digital information within the bulk of the transparent storage medium selected, or by fabricating diffraction gratings, diffractive optical elements or other optical structures therewithin.

In accord therewith, a macroscopically-homogenous transparent material having a material-dependent energy gap is selected to serve as an information storage medium. The macroscopically-homogeneous transparent material may generally be selected, among others, from the class of insulator materials, such as various types of glass, plastics, sapphire, ionic and covalent solids, and from the class of semiconductors, such as silicon, without departing from the inventive concepts.

An ultrashort pulse laser is selected to provide a laser write beam with a photon energy less than the energy gap of the information storage medium selected so that the material is substantially transparent to the beam. Any ultrashort pulse laser with a photon energy (wavelength) in the visible, infrared (IR) and ultraviolet (UV) may be selected without departing from the inventive concepts.

Information of predetermined type is selected to be written in the macroscopically-homogeneous transparent storage medium. Both digital information, such as "logical" bits, and non-digital information, such as logos, optical gratings, security codes, and other optical structures, may be selected to be written without departing from the inventive concepts.

The information of predetermined type is resolved into a pattern of plural information elements, and a pattern of locations that corresponds to the pattern of the information elements is specified inside the bulk of the macroscopically-homogeneous transparent storage medium. For digital information, the plural information elements are a sequence of "logical" bits and the locations are specified in X, Y and Z (or r, θ, Z) as a uniform grid of coordinate points defining data storage locations. For non-digital information, the plural information elements make up a whole such that each information element forms another part of the whole pattern to be written, and the locations are specified in X, Y and Z (or r, θ, Z) as coordinates that each form another part of the whole pattern selected to be written. In dependence on the type of non-digital information selected and/or on the scale selected, the information elements can have point-like, line-like or other geometrical shapes and the locations may be defined by coordinates defining points, lines or other geometrical shapes so as to conform to the information elements of the images, logos, optical gratings, security codes or other non-digital information pattern selected to be written as a whole without departing from the inventive concepts.

Each information element is written to another location in the bulk of the substantially-homogenous transparent storage medium by optically focusing at least one ultrashort pulse of laser energy thereto so as to cause the bulk of the transparent material at each such location to non-linearly absorb the energy thereof, by the mechanisms of multiphoton ionization and avalanche ionization, and to produce thereby a localized plasma, enclosed in the bulk of the transparent storage medium at each such location, which plasma so alters the bulk of the transparent material surrounding each such location as to permanently change the refractive index thereof, fabricating a crack-free and regularly-shaped structure at each such location. Reflective or refractive optics may be employed to focus the laser, and the information elements may be written sequentially, or simultaneously, each to another location in the bulk of the storage medium, without departing from the inventive concepts.

There are three different operating regimes for producing crack-free and regularly-shaped structures in the bulk of transparent materials with ultrashort laser pulses of pulsewidths in the range of pulse widths from a few femtoseconds (fs) to less than about two hundred (200) picoseconds (ps).

In a first, "low energy" tightly focused operating regime in accord with the present invention, tightly focused (N.A.≧about 0.5) laser pulses of pulse widths selected from a few fs to less than about two hundred (200) ps and of pulse energies selected from the threshold for structural change to an energy that is some factor times that energy produce crack-free regularly-shaped sub-micron-diameter voxels (volume elements) several microns in length in the bulk of the transparent material in form of a wall of densified material enclosing a void. For exemplary information written in fused silica, for example, the factor is about five (5). The energy threshold for structural change is defined, for a specific focusing condition, as the pulse energy above which the optical and structural properties of the material are altered, but below which, no material changes occur. The voxels have an index of refraction that varies by a significant factor from that of the bulk of the transparent material. In an exemplary 3-D optical digital data storage embodiment, the sub-micron-diameter and pronounced refractive index change of the voxels enable very high density WORM optical storage, and high-speed, serial and parallel readout. The significant change in the index of refraction that is produced allows a wide variety of optical read-out or information retrieval. This has the advantages of not requiring a complicated retrieval system, and of not being limited to serial (scanning) retrieval methods, thus making possible simple, fast, highly-parallel data retrieval techniques to be employed. Furthermore, the retrieval system could be compatible with ordinary CD's and future multi-layer CD's. For parallel (and serial as well) read-out, a standard optical microscope can be used in either transmitted light mode or in scattered light mode. Phase contrast microscopy can also be used. For serial read-out, scanning techniques, such as DIC laser microscopy, and, among others, confocal microscopy can be used.

In a second, "high energy" tightly focused operating regime in accord with the present invention, tightly focused (N.A.≧about 0.5) laser pulses of pulse widths selected from a few fs to less than about two hundred (200) ps and of pulse energies selected to be above the upper limit of the "low energy" operating regime produce two-part crack-free and regularly-shaped structures in the bulk of the transparent material, each structure consisting of at least one head portion a few microns in length and an axially-spaced, elongated tail of from a few to tens of microns in length. The two-part structures are believed to arise from self-focusing effects. The head and tail portions are each in the form of a wall of densified material enclosing a void. The more the pulse energy is increased above the upper limit of the "low energy" operating regime, the greater is the transparent material. The index of refraction thereof again considerably varies from that of the bulk of the surrounding transparent material. The increased visibility provided by the larger two-part structures renders them particularly well adapted for writing non-digital information.

In a third operating regime in accord with the present invention, less tightly focused (N.A.<about 0.5) laser pulses of pulse widths selected from a few fs to less than about two hundred (200) ps and of pulse energies selected to be above the focusing-dependent threshold produce crack-free and regularly-shaped filament-like structures of up to millimeters (mm) in length, where each filament consists of a wall of densified material enclosing a void. The threshold for structural change depends on the focusing conditions, increasing with less tight focusing.

BRIEF DESCRIPTION OF THE DRAWINGS

These and other aspects and features of the present invention will become apparent as the invention becomes better understood by those of skill in the art by referring to the following detailed description of the presently preferred embodiments thereof, and to the drawings, wherein.

DETAILED DESCRIPTION OF THE PREFERRED EMBODIMENTS

Figure 1A:
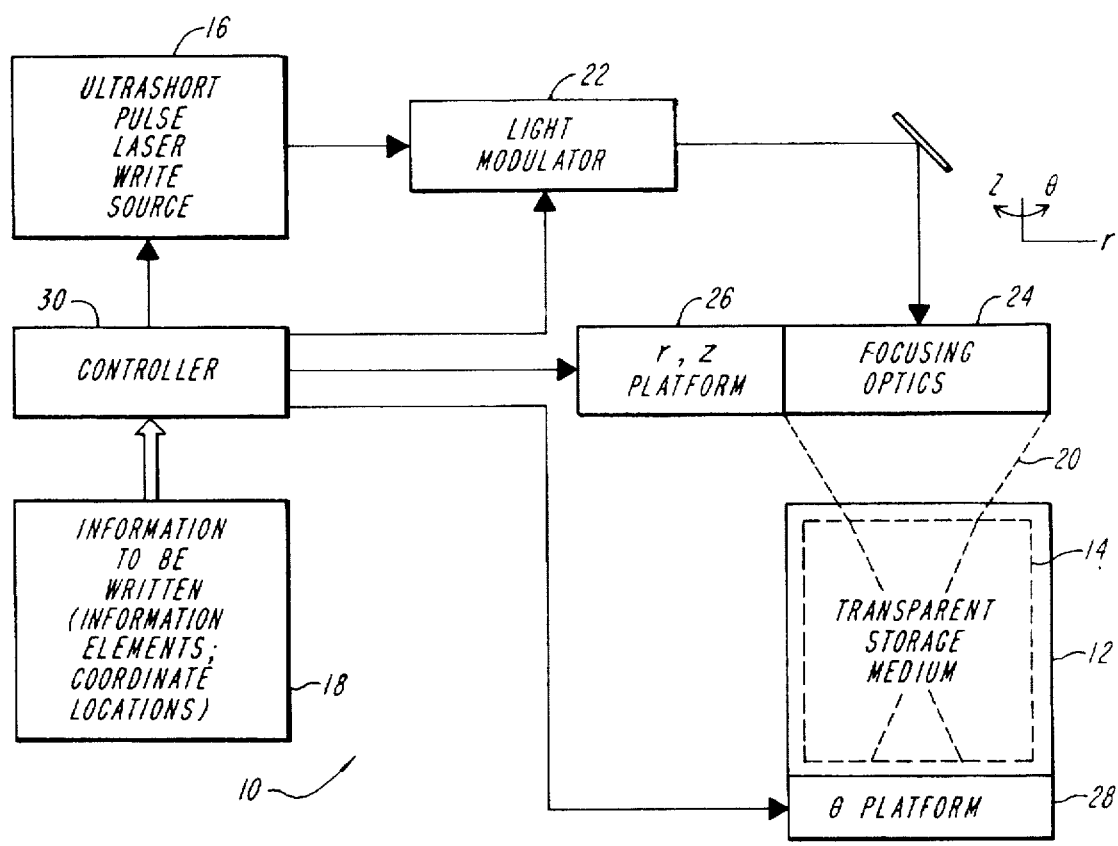
FIG. 1A is a block diagram of apparatus illustrating how digital and non-digital information elements may be sequentially-written in 3-D in transparent storage media in accord with the present invention.

Referring now to FIG. 1A, generally designated at 10 is a block diagram of apparatus illustrating how information elements may be sequentially written in 3-D in transparent storage media in accord with the present invention. The apparatus 10 includes a transparent storage medium 12 having a material-dependent energy gap and a macroscopically-homogenous internal volume schematically illustrated by dashed line 14. Any transparent insulator material, such as glass, plastic, ionic and covalent solids, and fused silica, and any semiconductor material, such as silicon, among other media transparent to the write beam, may be employed without departing from the inventive concepts. Because a very wide range of materials can be used to store information, a storage medium can be selected that is thermally, mechanically, chemically, optically, and electronically extremely stable and rugged, and, at the same time, inexpensive. This is in sharp contrast with the heretofore known 3-D optical storage media such as photopolymers, dye-impregnated polymers and phase-change media, where a specific, photosensitive material must be used, which typically has much poorer thermal, mechanical, chemical, optical, and electronic stability. Furthermore, the storage medium can be a true solid, and cannot be erased except by breaking the storage medium, or heating it to the melting temperature, which for fused silica (for example) is 1,600-degrees C. Additionally, the very wide range of materials that can be used permits the internal optical engraving, structuring, or marking without damaging or altering the surface, of a wide variety of transparent objects including, but not limited to, optical elements such as 3-D diffractive optical elements, fiber gratings, optical measurement instruments, objects of art, such as fine crystal and jewelry, and identifying objects, such as an optical identification card or security badge.

An ultrashort pulse laser write source 16 provides a laser write beam with a photon energy selected to be less than the energy gap of the transparent storage medium 12 so that the material is transparent to the beam. Any ultrashort pulse laser with a photon energy (wavelength) in the visible, infrared (IR) and ultraviolet (UV) may be employed without departing from the inventive concepts.

Figure 2:
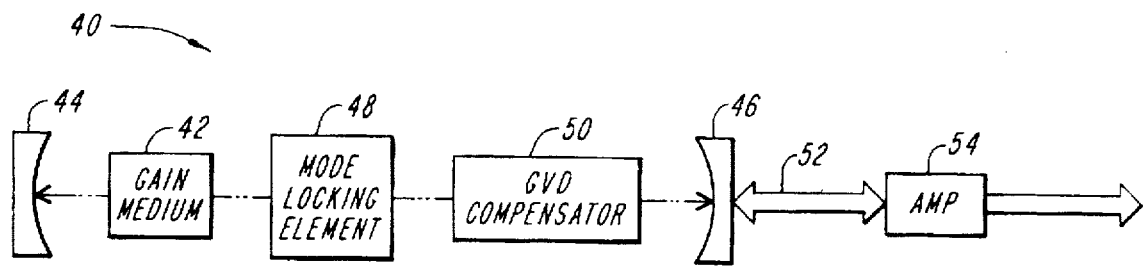
FIG. 2 is a block diagram of an ultrashort pulse laser write source in accord with the present invention.

Referring now briefly to FIG. 2, generally designated at 40 is a block diagram of an ultrashort pulse laser write source in accord with the present invention. In order for a laser to produce ultrashort pulses (in a few femtosecond to the few picosecond range) there are several essential requirements. The first is that the gain medium 42 of the laser 40, be it a solid medium, a dye-based solution, a semiconductor, or other lasing medium, must have a relatively broad gain bandwidth. The broad gain bandwidth is necessary so that a sufficient range of frequencies is available to lase simultaneously, with an appropriate phase relationship between them, so that their supposition produces a pulse much shorter than the length of the laser cavity formed by mirrors 44, 46. A mode-locking element 48 is provided to ensure the correct phase relationship between the frequencies (modes). Active mode-locking with an electrically-driven modulator is usually not sufficient to produce ultrashort pulses. Mode locking may be generally accomplished by some type of passive element such as a saturable absorber, which can be a real absorbing element whose absorption is saturated at high intensity, or, for example, by the combination of a self-focusing element together with an aperture, to provide an effect equivalent to a very fast saturable absorber, known as Kerr-lens modelocking (KLM). To produce the shortest pulses, a mechanism 50 is provided for cancelling the group velocity dispersion (GVD) in the cavity. GVD compensation is necessary to obtain the shortest possible pulses, but is not generally necessary to produce other than the shortest pulses within the range of pulse widths in accord with the present invention. GVD can be compensated with a set of properly arranged prisms, or by specially coated mirrors providing the desired frequency-dependent phase-delay. For the exemplary information written in accord with the present invention described hereinbelow, a mode-locked Ti:Sapphire laser producing 100-fs pulses at a wavelength of 780-nm was used. While this laser is pumped by an Argon-ion gas laser, advances in ultrashort pulse technology are likely to make semiconductor-laser-diode-pumped, all-solid-state lasers into practical tools, and, eventually, mode-locked semiconductor lasers themselves may become commercially available inexpensive sources of ultrashort pulses. Ultrashort pulses directly out of the laser cavity schematically illustrated by double headed arrow 52 have a pulse energy of a few nanojoules or less, with a repetition rate on the order of one hundred (100) MHz. This may require further amplification in an amplifier stage 54 outside of the laser cavity if higher energy pulses are needed. The amplifier can be a single- or multi-pass amplifier, or a so-called regenerative amplifier consisting of a second laser cavity with properly timed pulse injection and ejection. Chirped-pulse-amplification (CPA), whereby a pulse is first stretched in time, then amplified, and then re-compressed, thereby avoiding high intensities in the amplifier, may be employed for amplification to very high pulse energies. For the exemplary information recorded in accord with the present invention described hereinbelow, a CPA system with a regenerative amplifier was used, producing up to 500 μJ, 100-fs pulses, at a repetition rate of one (1) KHz.

Returning now to FIG. 1A, both digital and non-digital information may be permanently recorded in the bulk 14 of the transparent medium 12 in 3-D as schematically shown by a block 18. In accord with the present invention, the information of predetermined type is resolved into a pattern of plural information elements that corresponds to the information of predetermined type to be written and a plurality of locations are specified in the bulk 14 of the transparent storage medium 12 in a pattern that corresponds to the pattern of the plural information elements into which the information of predetermined type has been resolved. Information of "digital" type is resolved as a sequence of plural "logical" bits and locations are specified in r,θ (at a given Z, for 2-D information storage) and in r, θ, Z (for 3-D information storage) in the bulk 14 of the transparent storage medium 12 at coordinates that define a uniform data storage grid. Information of "non-digital" type is resolved as a whole of information elements such that each information element forms another part of the whole pattern to be written and locations are specified in r, θ (at a given Z, for 2-D information storage) and in r, θ, Z (for 3-D information storage) in the bulk 14 of the transparent storage medium 12 at coordinates which each correspond to another information element. For "non-digital" information, the information elements into which the whole pattern is resolved may be point-like, line-like or like some other geometrical shape and the locations corresponding thereto may be specified by coordinates defining points, lines or other geometrical shapes without departing from the inventive concepts.

Figure 3A:
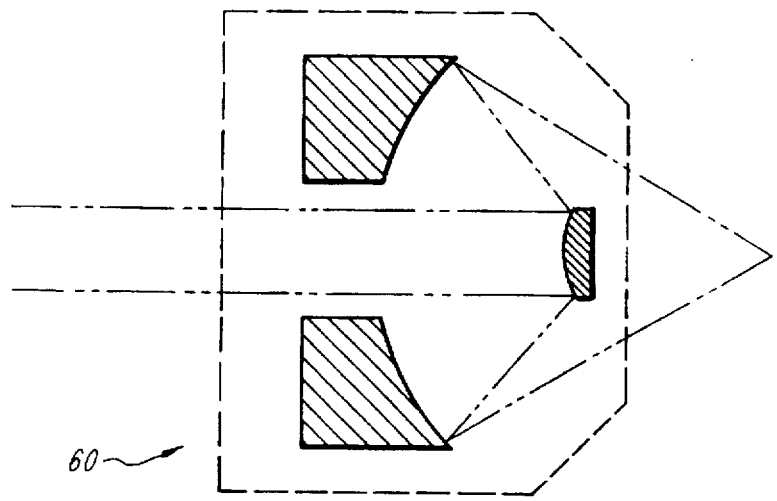
FIGS. 3A and 3B are sectional diagrams respectively representative of double-reflector and single-reflector focusing optics in accord with the present invention.
Figure 3B:
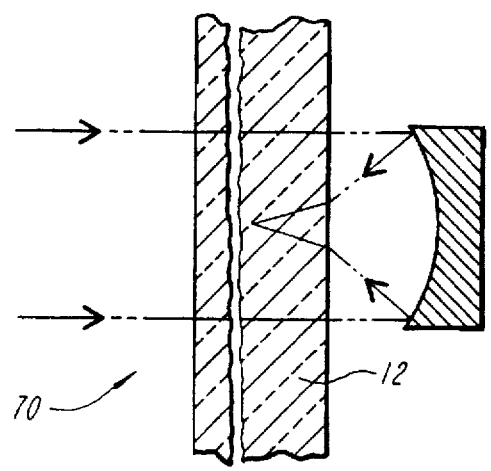

As shown by intersecting dashed lines 20, the laser write beam provided by the ultrashort pulse laser write source 16 is focused inside the bulk 14 of the transparent material 12 along an optical path that includes a light modulator 22 and focusing optics 24. A mechanical or electro-optic shutter may be employed for the light modulator 22. The focusing optics may generally be comprised by a refractive objective, not shown, or comprised by a reflecting objective, as illustrated by the two-element reflecting objective generally designated 60 in FIG. 3A and as illustrated by the single-element parabolic mirror generally designated 70 in FIG. 3B. One advantage of reflecting objectives over common refracting ones is the ability to provide greater working distances for a given numerical aperture (N.A.) in applications where storage depth becomes important.

A r, Z translation platform 26 coupled to the focusing optics 24 and a θ rotation platform 28 coupled to the transparent material 12 enable the laser write beam to sequentially write information elements at the different locations specified in the bulk 14 of the transparent material 12. Although a r, Z translation platform 26 and a θ rotation platform 28 are illustrated, it will be appreciated that the ultrashort pulse laser write beam and the transparent material 12 may be otherwise relatively displaced to sequentially write information elements at the different locations specified in the bulk 14 of the transparent material 12 without departing from the inventive concepts.

Figure 1B:
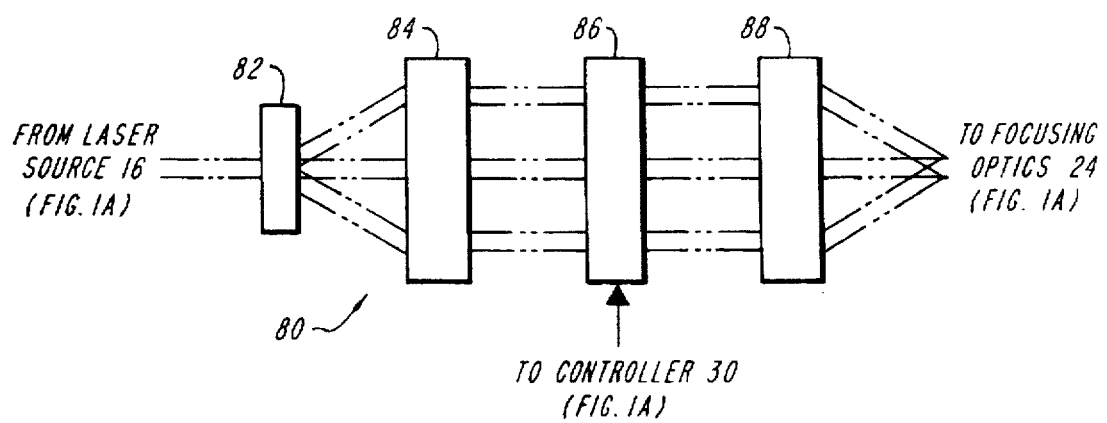
FIG. 1B is a block diagram of an optical subassembly enabling the apparatus of the FIG. 1A to simultaneously-write multiple information elements in the bulk of transparent storage media in accord with the present invention.

Referring now briefly to FIG. 1B, generally designated at 80 is a block diagram of an optical subassembly enabling the apparatus 10 of FIGURE A to simultaneously write multiple information elements in the bulk of transparent storage media in accord with the present invention. The write beam produced by the write source 16 ( FIG. 1A) is directed to the focusing optics 24 (FIG. 1A) along an optical path that includes a beam splitting element 82, beam steering optics 84, an electrically addressable 2-D spatial light modulator 86 and beam steering optics 88. The beam splitting element 82, which may be a diffractive optical element (DOE), splits the output pulse of the write source 16 (FIG. 1A) into multiple simultaneous pulses. The beam steering optics 84, which may be another DOE, collimate the multiple simultaneous pulses output by the beam splitting element 82. In dependence on the information of predetermined type to be written, the electrically addressable 2-D spatial light modulator, which may be a liquid crystal display (LCD), selectively passes some of the collimated, split beams, which are then steered by the beam steering optics 88 to the focusing optics 24 (FIG. 1A), therewith enabling simultaneous writing of plural information elements to multiple locations in the bulk of the transparent information storage medium.

Figure 1C:
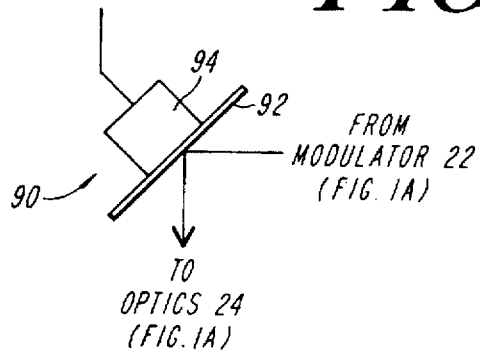
FIG. 1C is a block diagram of an optical subassembly enabling the apparatus of the FIG. 1A to sequentially write information elements without relatively moving either the ultrashort pulse laser source or the transparent storage medium.

Referring now briefly to FIG. 1C, generally designated at 90 is a block diagram of an optical subassembly enabling the apparatus 10 of FIG. 1A to sequentially write information elements without relatively moving the ultrashort pulse laser write source 16 (FIG. 1A) and transparent storage medium 12 (FIG. 1A). The subassembly 90 includes a reflector 92 positioned along an optical path between the light modulator 22 (FIG. 1A) and the focusing optics 24 (FIG. 1A). A two degree of freedom actuator 94 is mounted to the back of the reflector 92. By controllably angling the reflector 92 by the two degree of freedom actuator 94, information elements may be sequentially written to different storage locations specified therefor without relatively moving the laser write source 16 (FIG. 1A) and transparent storage medium 12 (FIG. 1A).

Returning now to FIG. 1A, a controller 30 coupled to the laser write source 16, the light modulator 22, the r, Z platform 26 and to the θ platform 28 and responsive to the information 18 of predetermined type to be written is operative to write each information element to another location in the bulk 14 of the transparent medium 12. During operation in one of three operating regimes described more fully hereinbelow, each information element is written at another location as a regularly-shaped and crack-free structure exhibiting a pronounced refractive index change vis à vis the unaltered bulk of the transparent storage medium by delivering at least one focused ultrashort laser pulse to each such location of pulse width from a few fs to less than about two hundred (200) ps.

A likely mechanism for the fabrication of the individual regularly-shaped and crack-free structures of significantly changed index of refraction is a "micro-explosion" that is induced inside the bulk 14 of the transparent medium 12 locally about each location where an information element is to be written. The at least one focused ultrashort laser pulse causes the bulk of the transparent material to non-linearly absorb the energy thereof. The possible mechanisms of non-linear absorption include multi-photon ionization and avalanche ionization. For example, in fused silica, it takes about five (5) photons (at 780-nm) to span the gap and in sapphire, it also takes about five (5) photons (at 780-nm) to span the gap. The focused ultra-fast non-linear energy deposition creates a small region of high temperature and pressure inside the bulk 14 of the transparent medium 12 locally about each location where an information element is to be written, ejecting and forcing material therefrom and into the surrounding volume, thereby fabricating the individual regularly-shaped and crack-free structures of significantly changed index of refraction in the bulk of the transparent storage medium.

For a detailed description of the mechanisms of electric breakdown by non-linear absorption (multi-photon and avalanche ionization), and for experimentally-observed breakdown thresholds in transparent materials, reference may be had to Bloembergen, "Laser-Induced Electric Breakdown In Solids," IEEE Journal of Quantum Electronics, Vol. QE-10, No. 10, pp. 375–386 (1974) for ns pulse widths; and to Du et al., "Optical Breakdown In Wide-Band-Gap Materials As a Function Of Pulse Duration," Proceeding of UltraFast Phenomena 159–161 (1994), to Du et al., "Laser-Induced Breakdown By Impact Ionization In $SiO_2$ With Pulse Widths From 7 ns To 150 fs," Appl. Phys. Lett., Vol. 64, No. 23, 3071–3073 (1994), and to Stewart et al., "Laser-Induced Damage In Dielectrics With Nanosecond To Sub-Picosecond Pulses," Phys. Rev. Lett., Vol. 74, No. 12, 2248–2251(1995) , for ps and fs pulse widths. Reference may also be had to Ihlemann et al., "Nanosecond and Femtosecond Excimer Laser Ablation Of Fused Silica," Appl. Phys. A. 54, 363–368(1992); Pronko et al., "Machining Of Sub-Micron Holes Using a Femtosecond Laser At 800 nm," Optics Communications 114 106–110 (1995); Kuper et al., "Femtosecond UV Excimer Laser Ablation," Appl. Phys. B. 44, 199–204 (1987), and to Kuper et al., "Ablation Of UV-Transparent Materials With Femtosecond UV Excimer Laser Pulses," Microelectronic Engineering 9 475–480 (1989), for a description of the mechanisms of surface ablation by non-linear absorption (multi-photon and avalanche ionization), and experimentally-observed ablation thresholds in transparent and other materials, for ns and fs pulses.

Figure 4A:
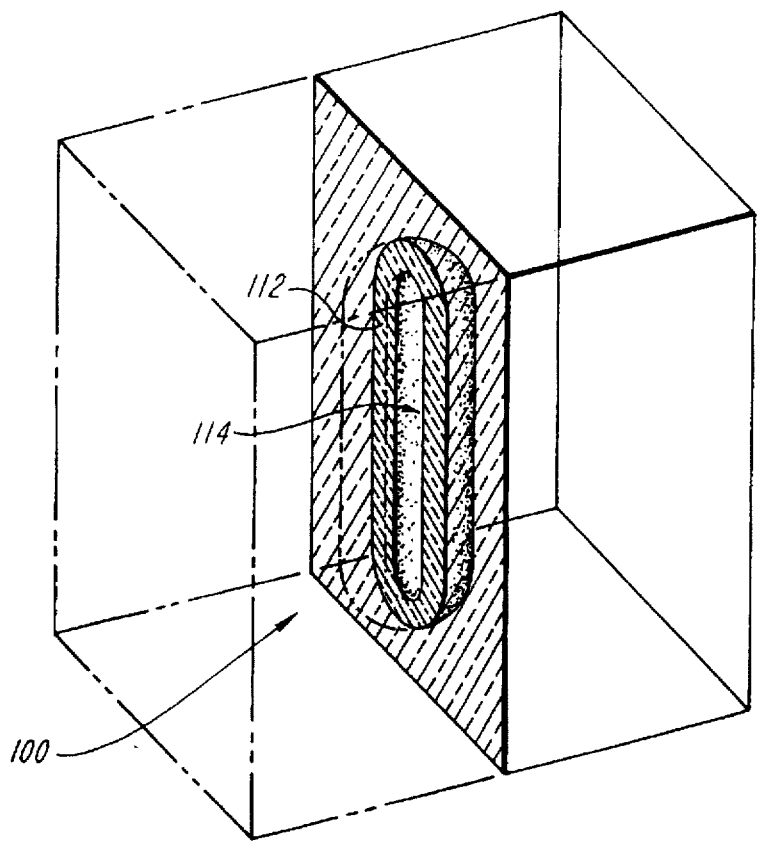
FIGS. 4A, 4B are pictorial diagrams representative of crack-free and regularly-shaped structures respectively written during operation in the first "low energy" and the second "high energy" operating regimes in accord with the present invention.

In accord with the present invention, and referring now to FIG. 4A, it has been found in a first "low energy" operating regime that tightly focused (N.A.≧about 0.5) laser pulses of pulse width selected from a few fs to less than about two hundred (200) ps and of pulse energy selected from the threshold for structural change to some factor times that threshold produce in the bulk of the transparent material a sub-micron-diameter voxel generally designated 100 in form of a crack-free and regularly-shaped wall 112 of densified material enclosing a void generally designated 114. The energy threshold for structural change is defined, for a specific focusing condition, as the pulse energy above which the optical and structural properties of the material are altered, but below which, no material changes occur. In general, the numerical aperture of the focusing optics is selected to give the desired focal spot size and Rayleigh range (which scales as the inverse of the square of the N.A.). For digital information storage, the largest available N.A. for a sufficient working distance is selected to provide maximum storage capacity. In this first "low energy" operating regime, the voxels produced can be of sub-micron-diameter, are entirely free of cracks in the bulk of the transparent storage material, and have regularly-shaped walls. Using a 0.65 N.A. objective, 200-nm diameter voxels are produced, based on SEM and AFM data described hereinbelow. The ultrasmall scale (sub-wavelength) of the voxels 100 is believed to be due to the non-linearity of the energy absorption mechanism and to the dynamics of the induced "microexplosion." With this focusing, the recording density limit is about $10^{13}$ bits per $cm^3$, based on 200-nm in-plane spacing and 2.5-µm inter-plane spacing. The maximum storage density is expected to scale with the fourth power of the N.A.. Even with a much larger spacing of say 1-µm in-plane spacing and a 10-µm inter-plane spacing, a 1-mm thick CD-ROM sized disc would hold about $10^{12}$ bits (or 1 Terabit) of data.

Figure 4B:
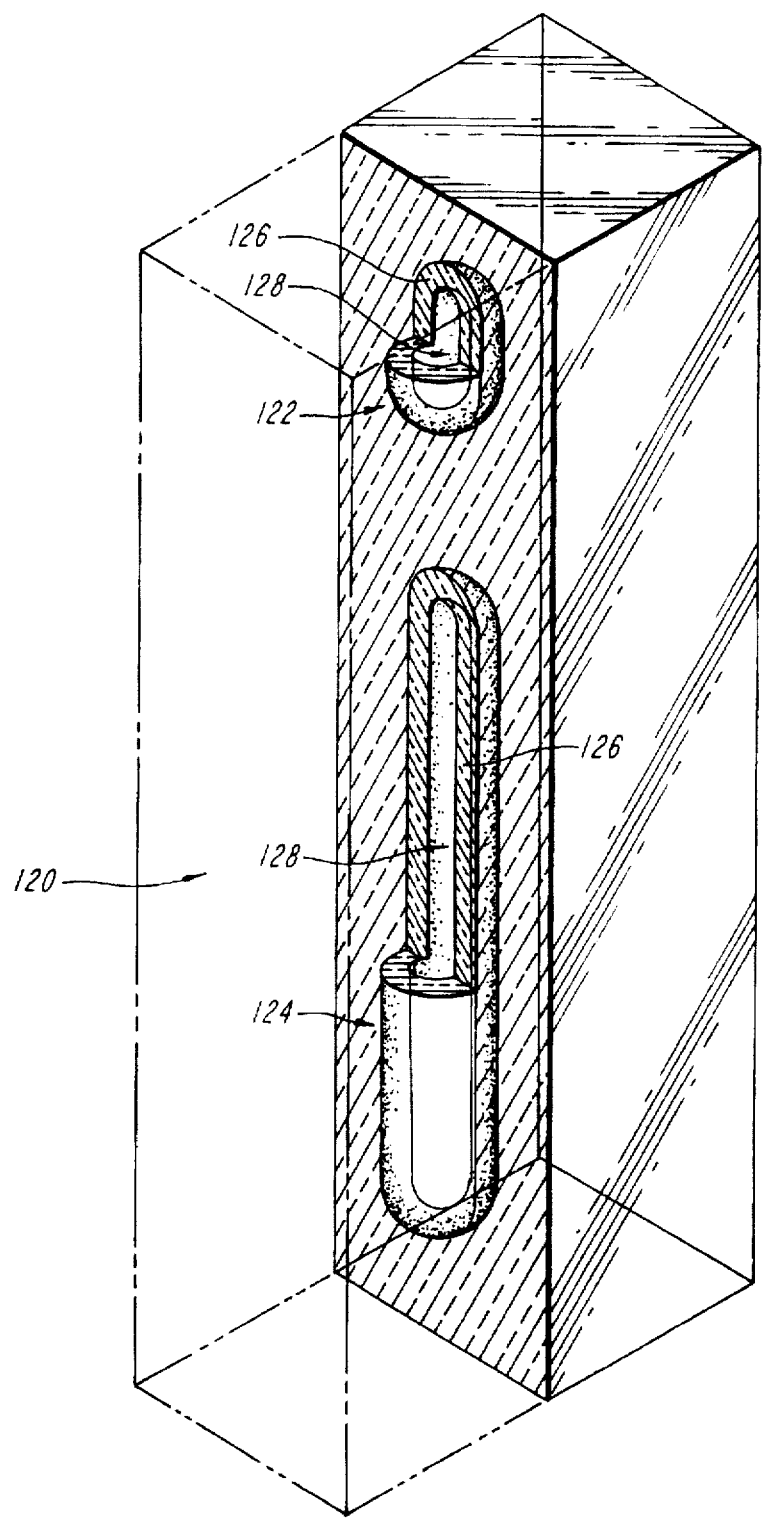

In a second "high energy" operating regime in accord with the instant invention, and referring now to FIG. 4B, it has been found that tightly focused (N.A.≧about 0.5) laser pulses of pulse width selected from a few fs to less than about two hundred (200) ps and of pulse energy selected to be above the upper limit of the "low energy" operating regime produce a micron-diameter structure generally designated 120 in the bulk of the transparent material in form of at least one head generally designated 122 a few microns in length and an axially-spaced, elongated tail generally designated 124 of from a few to tens of microns in length. As for the voxels 110 (FIG. 4A) produced in the first "low energy" operating regime, the head and tail 122, 124 of the structures 120 produced in the second "high energy" operating regime are free of cracks, possess a wall 126 of densified material enclosing a void generally designated 128, and are regularly-shaped. As will readily be appreciated by those of skill in the art, the larger scale of the micron-diameter structures 120, that may be controllably produced in the second operating regime, are particularly advantageous for writing non-digital information, where storage density is not a factor. The formation of the tail 124 is believed to be due to self-focusing effects. Reference may be had to Soileau et al., "Laser Induced Damage and the Role Of Self-Focusing," Optical Engineering 28(10), 1133–1143 (1989), for a detailed account of self-focusing effects on bulk laser-induced damage in transparent materials.

In a third operating regime in accord with the instant invention, it has been found that less tightly focused (N.A.<about 0.5) laser pulses of pulse width selected from a few fs to less than about two hundred (200) ps and of a pulse energy selected to be above the focusing-dependent threshold produce an elongated filament, not shown, of from tens of microns to about a few mm. The filaments may be single or multi-part. The elongated filaments again are characterized by crack-free and regularly-shaped regions of densified material enclosing voids defining a marked change of the index of refraction vis à vis the bulk of the transparent storage medium. The filaments are particularly advantageous for engraving 2-D type patterns with long Z-direction extent. The filament length and the energy threshold for structural change both increase with less tight focusing.

It should be noted that the division into the three operating regimes in accord with the present invention is not intended to provide a sharp boundary between distinct modes of operation. Rather, what is intended is to point out a range of crack-free and regularly-shaped structures that can be produced in accord with the present invention and to provide a guide to the focusing conditions and pulse energy levels therefor. The first, "low energy," operating regime provides the highest storage density due to the small extent of the thereby produced voxels. As the pulse energy is increased, the second, "high energy," operating regime is approached, which provides larger and correspondingly more visible structures, whose size continues to gradually increase with higher pulse energy.

The boundary between the low and the high operating regimes has been placed at that pulse energy where multi-part structures appear, as opposed to the single voxels. The factor of five (5) in energy range that falls within the low energy operating regime was observed for fused silica. This factor is expected to be material dependent. It is significant that there is a large range of pulse energy wherein single voxels can be produced.

The comparatively-tight focusing called for by these two operating regimes is used to limit the axial extent of the structures. When structures with longer axial extent are to be produced, the tightness of the focusing is reduced, and comparatively-loose focusing is accordingly called for in the "third" operating regime. The 0.5 N.A. boundary in focusing conditions between the third and the first two operating regimes is then to be understood as exemplary only, serving to indicate a choice of comparative size, since the transition to larger sized structures is gradual as the tightness of focusing is reduced.

It should also be noted that the maximum pulse width of the range of pulse widths for any of the three operating regimes in accord with the present invention has been set at less than about two hundred (200) ps since it has been found that at about two hundred (200) ps, and longer, the resulting structures are no longer crack-free nor are they regularly-shaped. The pulse width threshold beyond which the resulting structures are no longer crack-free and regularly-shaped is likely to be material-dependent and probably will lie between one (1) ps to one hundred (100) ps; the two hundred (200) ps pulse width therefore seems to be a safe upper bound. There is expected to be no lower limit on the pulse duration for creating structures in transparent media in accord with the present invention, the only limit is the ability to produce ultrashort pulses, which presently are limited to about 6–8 fs, and are fundamentally limited by the Fourier relations between the time and frequency domains. As will be appreciated by those of skill in the art, the shortest pulses will be stretched by group velocity dispersion as they propagate through transparent media; accordingly, if the shortest possible excitation is desired, a pulse will have to be pre-chirped before entering the medium.

Figure 5C:
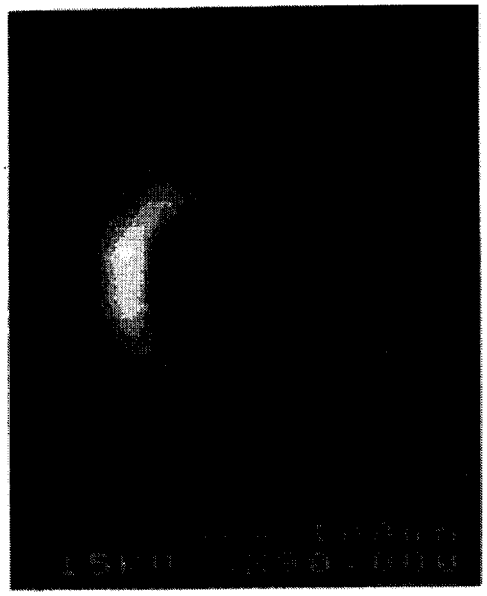
FIGS. 5B and 5C are SEM micrographs, illustrating sub-micron-diameter voxels of an exemplary digital pattern written under the "low energy" operating regime in accord with the present invention.
Figure 5A:
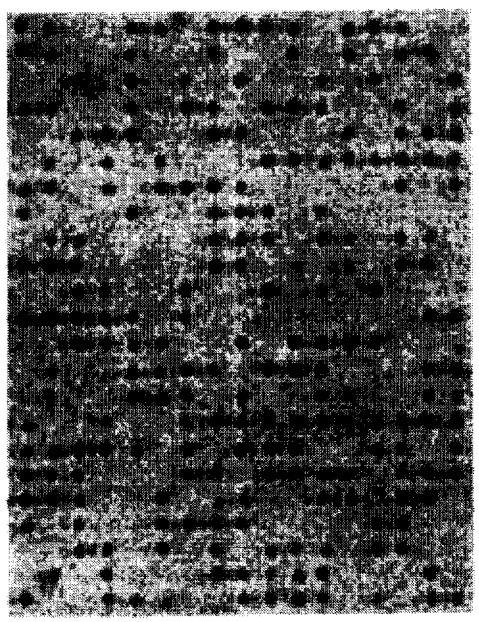
FIG. 5A is an optical micrograph (with digitally enhanced contrast)

FIG. 5A shows an example of a random binary pattern stored inside fused silica, recorded using 0.5-µJ, 100-fs, 780-nm pulses from an amplified Ti:sapphire laser, focused by a 0.65 numerical aperture (N.A.) microscope objective in the first "low energy" operating regime in accord with the present invention. In fused silica at these focusing conditions, the energy threshold for structural alteration is 0.3-µJ. It should be noted that the threshold for structural alteration is very similar (within a factor of 2) for such different materials as fused silica, sapphire and plastic. This is expected to be the case for virtually all transparent materials, with the notable exception of diamond, where the threshold for structural alteration is larger by a factor of at least one hundred (100). The 0.5-µJ pulse energy employed, which is nearly a factor of two (2) above the threshold, ensures that sufficient energy is available to produce structural changes well-below the surface, where the focusing is not as tight due to non-ideal focusing through the fused silica with the standard objective. The image is read out using transmitted light in a microscope with a 0.95 N.A. objective. The spacing between adjacent bits is 2-µm. The written spots can be viewed as dark or bright points depending on the position of the read-out objective. This can be used as a focusing and a contrast enhancing feature in a read-out system to be described. During read-out, the depth discrimination provided by the short depth-of-field of the 0.95 N.A.

objective is sufficient if adjacent layers are spaced by about 10-μm or more. More densely spaced patterns may be read out using (serial) scanning techniques such as confocal or DIC laser microscopy to be described, but the inter-layer spacing is still limited by the longitudinal extent of the structurally altered regions, which is about 2.5-μm. Smaller diameter and shorter length features may be provided with objectives having N.A. greater than 0.65. Ten (10) layers spaced by 15-μm, using a standard 0.65 N.A. refractive objective were recorded. Using a reflective objective with a large working distance and an adjustment for aberrations caused by focusing into the material, over one hundred (100) layers, spaced by 10-μm with 1μm in-plane spacing would be possible, providing $10^{12}$ bit (or 1 Terabit) storage in the size of the standard CD-ROM of one (1) mm thickness. Under the conditions used in the above-described demonstration, an ultrashort pulse laser with an average power output of one (1) Watt, could be operated at a pulse rate of two (2) MHz, providing a storage rate of 2-Mbit per second in fused silica. Materials with lower thresholds, tighter focusing, or higher average power lasers could be used for even faster storage.

Figure 5B:
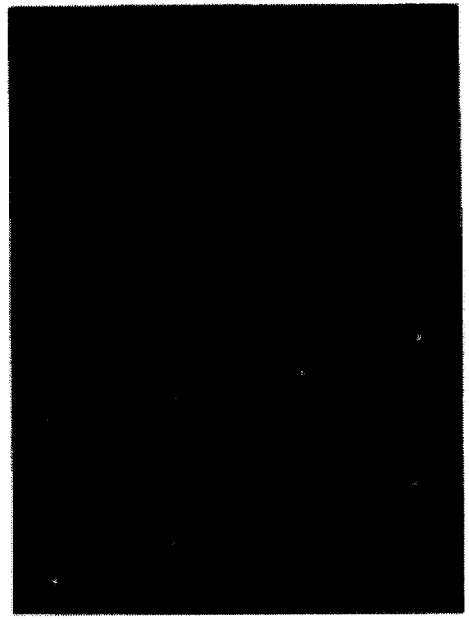

The 1-μm apparent size of the spots in FIG. 5A is near the resolution limit of the optical microscope. To obtain information about the extent of the structural changes in the material, the fused silica sample was polished away to reach the surface level where the voxels were embedded in the bulk of the transparent material. A 30-nm gold coat was applied, and the sample was viewed under a scanning electron microscope (SEM). FIG. 5B shows a SEM image of a five-by-five μm regular array of spots recorded under conditions identical to those used to record the pattern of data bits in FIG. 5A. The sample is tilted in the SEM to better show the morphology. The bright spots correspond to protrusions on the surface, while the dark spot (top row, second from the right end) corresponds to a cavity in the surface, as verified with an atomic force microscope (AFM). The protrusions indicate the creation of denser, harder material, more resistant to the mechanical polishing; deeper polishing exposes a pit corresponding to a void (or at least less dense material) which is created at the center of the "micro-explosion". It is noted that the present invention can be used for fabricating regions of increased density and hardness in many transparent (to the write beam) materials. Whether a structurally altered region appears as a protrusion or a cavity depends on the level to which the material is polished. A typical cavity is shown at higher magnification in the SEM micrograph of the FIG. 5C, where the scale bar marks 100-nm. Both types of features have diameters of roughly 200-nm, giving a recording density limit of about $10^{13}$ bits per cubic centimeter with a 0.65 N.A. objective.

Figure 6A:
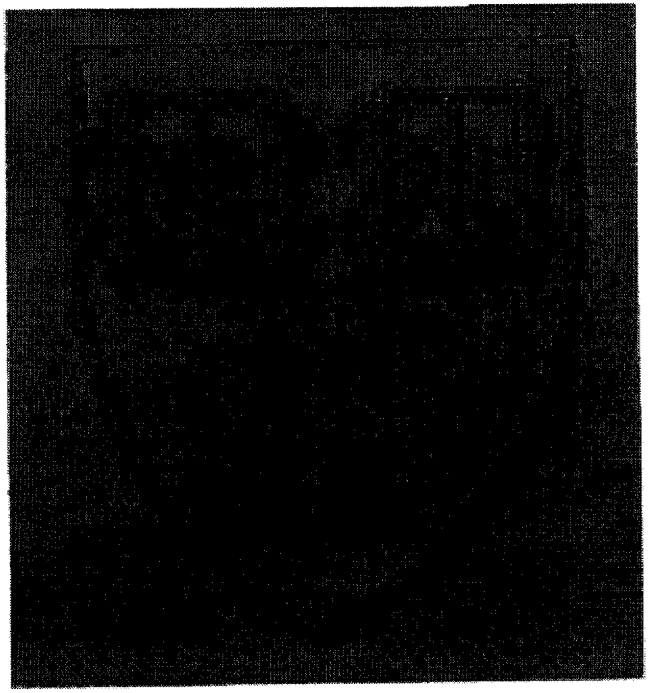
FIGS. 6A, 6B are optical micrographs of exemplary non-digital information written in 2-D (in the bulk) under the "high energy") operating regime in accord with the present invention.
Figure 6B:
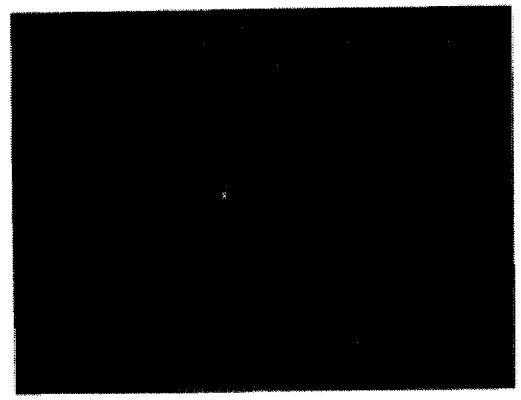

FIGS. 6A is an optical micrograph illustrating the "veritas" logo of the assignee of the instant invention written in 2-D in the bulk of BK7 glass during operation in the third operating regime in accord with the present invention. In FIG. 6A, the "veritas" whole pattern was resolved into plural information elements of 7-μm diameter spaced on 15-μm centers and bit-mapped. The width of the shield is 1-mm. FIG. 6B is a close-up of the "VE" portion of the whole "veritas" pattern. The focusing was provided by a 0.25 N.A. objective, the pulse width is 100-fs and the pulse energy is about 80-μm J. It may be noted that five (5) laser shots per point were used to enhance the visibility.

Figure 7:
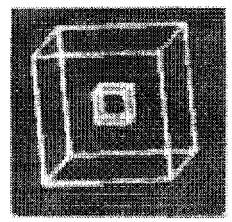
FIG. 7 is an optical micrograph of another example of non-digital information written in 3-D under the "third" operating regime in accord with the present invention.

FIG. 7 is another example of non-digital information written in 3-D during operation in the third operating regime in accord with the present invention. The "cube inscribed within a cube" whole pattern illustrated is comprised by an inner cube of one-half (½) mm in size and an outer cube of two (2) mm in size. In FIG. 7, the "cube within a cube" whole pattern was resolved into plural information elements of about 5-μm diameter spaced on 5-μm centers. The focusing conditions and pulse width are the same as in the FIG. 6, and the pulse energy is about 40-μJ.

Figure 8B:
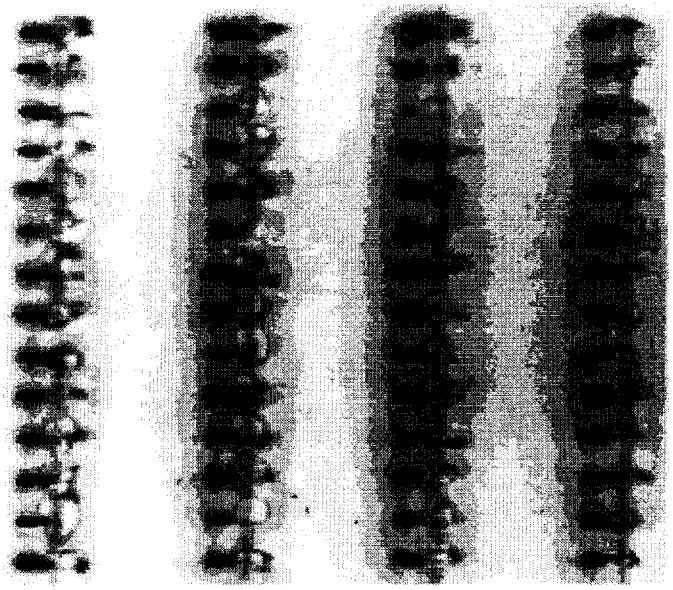
FIGS. 8A, 8B are optical micrographs illustrating the cracking and ir-regular shapes produced when exemplary digital information is written in a manner that falls outside the scope of the present invention.
Figure 8A:
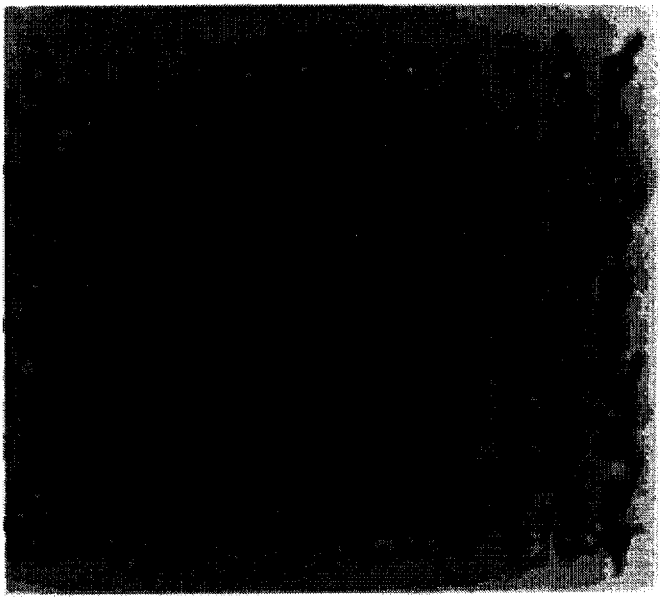

FIG. 8A is a top view, and FIG. 8B is a side view, of a regular bit pattern written at the same wavelength and focusing conditions as that of the FIG. 5, but with laser pulses of pulse widths outside of the pulse widths in accord with the three operating regimes of the present invention, namely with two hundred (200) ps pulses. With 200-ps pulses, the threshold for internal structural alteration is 3-μm, which is about a factor of ten (10) greater than for 100-fs pulses. As can readily be seen, ir-regularly shaped structures and cracking is apparent even though the pulse energy is only a factor of three (3) above the threshold. Even at the threshold, cracking and irregular shapes were apparent. As best seen in FIG. 9B, the structures are no longer regularly shaped, displaying random cracks at the right hand edges of the structures.

Figure 9:
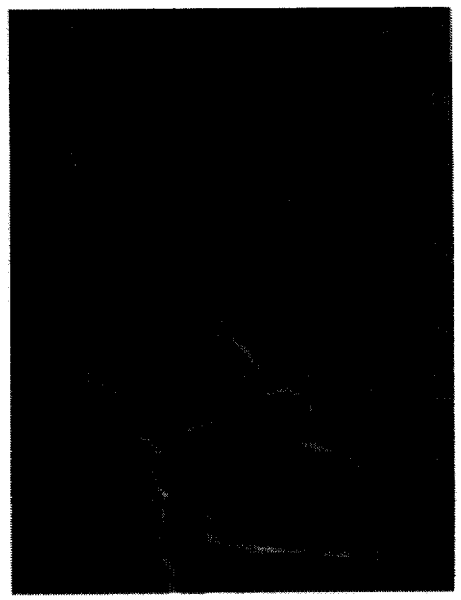
FIG. 9 is a SEM micrograph illustrating another example of the cracking and irregular shapes produced when exemplary digital information is written in a manner that falls outside the scope of the present invention.

FIG. 9 is a SEM micrograph of a single structure produced with a 7-ns pulse of 532-nm wavelength and pulse energy of about twice the threshold of 14-μJ focused by a 0.25 N.A. objective, in a manner outside the three operating regimes in accord with the present invention. The sample was prepared the same as in FIG. 5. As can readily be seen, the structure is ir-regularly shaped and extreme cracking is apparent in this cross-sectional view. The size and irregular shape are in sharp contrast with the voxel illustrated in the FIG. 5C, where the magnification is over ten (10) times greater.

In all three of the described regimes, the thresholds have been defined at the specific focusing conditions for specific structural alterations in accord with the present invention. There energy thresholds refer to the total energy contained in the main pulse, as well as possible additional pre- or post-pulses.

In all three of the described regimes, the thresholds for the described structural alterations are dependent on pulse width, focusing conditions, wavelength, and the material used as the storage medium. Additionally, the energy thresholds can be affected by the presence or absence of "pre-pulses" or "post-pulses" in the write beam propagating colinearly with the main pulse. In the Ti:sapphire laser system of the exemplary embodiments, a pre-pulse which contains about ten (10) percent of the energy precedes the main pulse by about 6-ps.

Furthermore, by introducing an extra set of pre-pulses into the write beam preceding the main pulse by 30-ns, 20-ns and 10-ns of increasing magnitude such that the largest of these contains less than ten (10) percent of the main pulse energy, it was observed that the visibility of the voxels was increased by more than even doubling the energy in the main pulse alone and that the threshold for the structural change described in the first regime was lowered.

Possible effects of pre-pulses can include seeding the absorption for the main pulse and/or enhancing the focusing of the main pulse.

Figure 10:
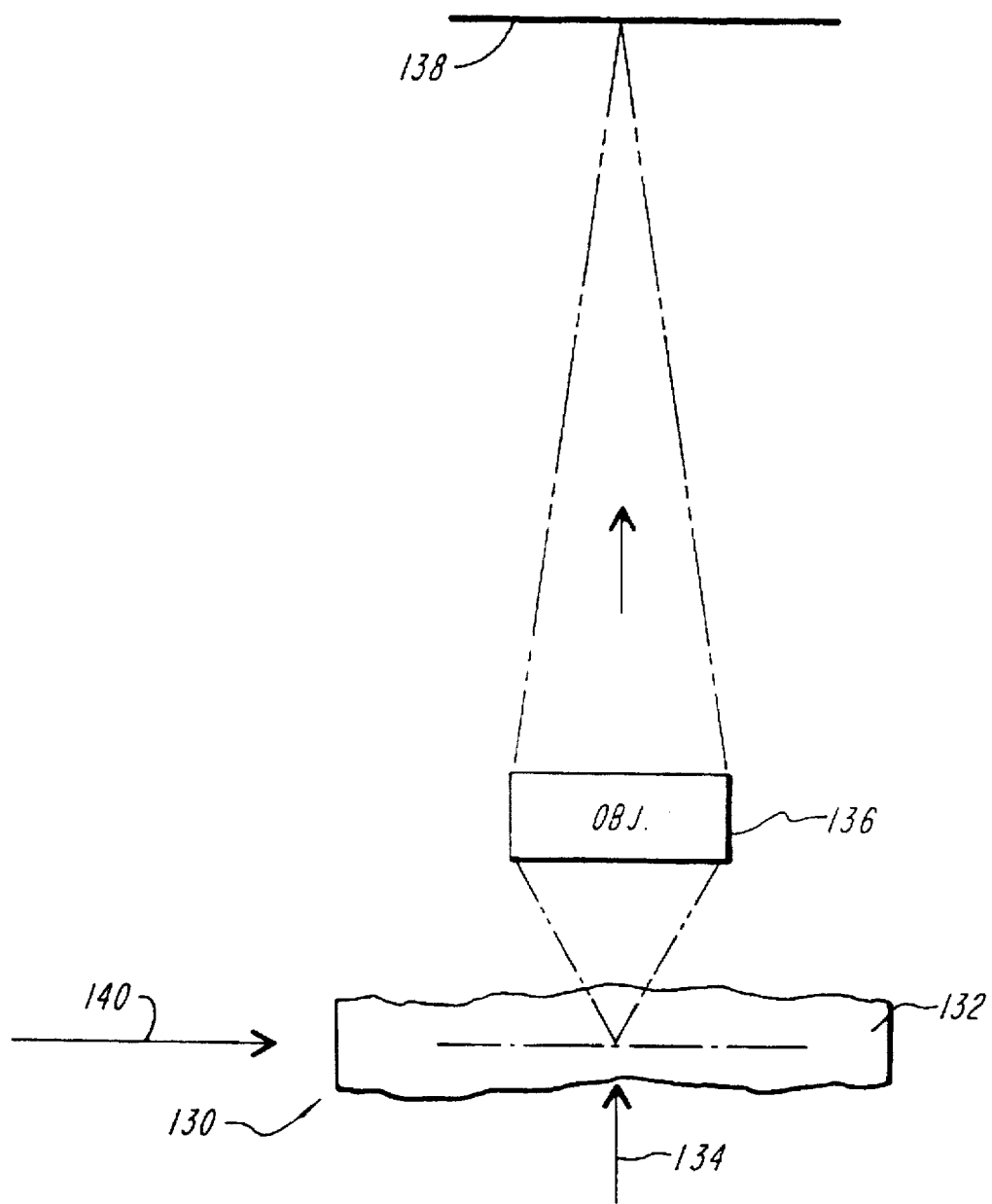
FIG. 10 is a block diagram of one embodiment of a read-head in accord with the present invention.

Referring now to FIG. 10, generally designated at 130 is a block diagram of a standard microscope with transmitted or scattered light to provide information retrieval. Transparent medium 132 having structures to be read is positioned along an optical path that includes a source of illumination in transmitted light mode schematically illustrated by arrow 134, objective 136 and image plane 138, where, in dependence upon the predetermined type of information to be read, a single detector, a linear photodiode array or a 2-D CCD array detector is positioned, not shown. Both transmitted light and scattered light read-out are possible. In transmitted light mode 134, the structures act as small refractive elements, whereas with non-axial illumination schematically illustrated by arrow 140, the structures serve to scatter the light. Another method to provide read-out with enhanced contrast is by using a phase contrast microscope in a transmitted light mode where the illumination is provided by an illuminating objective having a phase mask conjugate to another phase mask in the read-out objective. For even higher contrast and resolution, serial read-out techniques, such as DIC laser microscopy or confocal microscopy may be employed. DIC laser microscopy provides the highest transverse and axial resolution and reference may be had to U.S. Pat. No. 5,289,407, incorporated herein by reference, for a description of DIC laser microscopy in this context.

Many modifications of the presently disclosed invention will become apparent to those of skill in the art having benefited by the instant disclosure without departing from the inventive concepts.

What is claimed is:

1. A method providing optical information storage in a transparent material having a bulk and an energy threshold for structural change in said bulk, comprising the step of:
   (a) controllably focusing ultrashort laser pulse in the bulk of said transparent material of energy above said energy threshold so as to produce a plasma therewithin that acts to fabricate permanent structures of high-contrast refractive index therewithin having regularly-shaped walls that are free of cracks in the bulk about each said permanent structure; and
   (b) patterning the same so as to record information of predetermined type therewithin.

2. The invention of claim 1, wherein said information of predetermined type is digital information.

3. The invention of claim 1, wherein said information of predetermined type is non-digital information.

4. A method providing optical information storage in transparent materials, comprising the steps of:
   (a) selecting a transparent material having a material-dependent energy gap, a bulk and an energy threshold for structural change in said bulk to serve as an information storage medium;
   (b) selecting a laser to provide a laser write beam with a photon energy less than the energy gap of said transparent material so that the laser write beam is substantially transparent thereto;
   (c) selecting information of predetermined type to be written;
   (d) resolving the information of predetermined type to be written as a pattern of plural information elements that is representative of the information to be written;
   (e) defining inside the bulk of the transparent storage material a pattern of locations that correspond to the pattern of the information elements into which the information of predetermined type has been resolved; and
   (f) writing each information element to another location in the bulk of the transparent storage material by so optically focusing the laser write beam at each such location and by so delivering at least one ultrashort pulse of energy thereto of energy above said energy threshold for structural change in said bulk as to cause the bulk of the transparent material at each such location to non-linerly absorb the energy of the pulse, by at least one of the mechanisms of multiphoton ionization and avalanche ionization, producing thereby a localized plasma enclosed in the bulk of the material surrounding each such location, which plasma so alters the bulk of the transparent material surrounding each location as to permanently change the refractive index thereof, fabricating a permanent structure having regularly-shaped walls at each such location free of cracks in the bulk about each said permanent structure.

5. The invention of claim 4, wherein said transparent material is selected from the class of insulators.

6. The invention of claim 5, wherein said insulating transparent material is a glass.

7. The invention of claim 5, wherein said insulating transparent material is a plastic.

8. The invention of claim 5, wherein said insulating transparent material is an ionic solid.

9. The invention of claim 5, wherein said insulating transparent material is a covalent solid.

10. The invention of claim 5, wherein said insulating transparent material is fused silica.

11. The invention of claim 4, wherein said transparent material is selected from the class of semiconductor materials.

12. The invention of claim 11, wherein said semiconductor transparent material is silicon.

13. The invention of claim 4, wherein said photon energy of said laser write beam is selected to lie in the visible region of the spectrum.

14. The invention of claim 4, wherein said photon energy of said laser write beam is selected to lie in the infrared (IR) region of the spectrum.

15. The invention of claim 4, wherein said photon energy of said laser write beam is selected to lie in the ultraviolet (UV) region of the spectrum.

16. The invention of claim 4, wherein said information of predetermined type is information that may be represented as a sequence of individual information elements.

17. The invention of claim 16, wherein said information of predetermined type is a plurality of individual "logical" bits.

18. The invention of claim 4, wherein said information of predetermined type is information that may be represented as a whole of information elements each forming another part of a whole pattern to be written.

19. The invention of claim 18, wherein said information defines an optical structure fabricated in the material.

20. The invention of claim 18, wherein said information is a logo.

21. The invention of claim 18, wherein said information is an image.

22. The invention of claim 4, wherein said pattern of plural information elements is a sequence, said plural information elements are "logical" bits, and wherein said pattern of locations is patterned to specify a grid of storage locations for digital information in the bulk of said transparent storage medium.

23. The invention of claim 4, wherein said pattern of plural information elements is a whole pattern, said plural information elements each form another part of the whole pattern, and wherein said pattern of locations is patterned as a whole of locations each forming another part of the whole pattern in the bulk of said transparent storage medium.

24. The invention of claim 23, wherein said pixels are point-like and said locations each define coordinate points.

25. The invention of claim 23, wherein said pixels are line-like and said locations each define coordinate lines.

26. The invention of claim 4, wherein said material has a focusing-dependent energy threshold for structural change, and wherein said writing step is accomplished by focusing optics having a numerical aperture greater than or equal to about 0.5, by pulse widths selected from the range of a few femtoseconds to less than about two hundred (200) picoseconds, and by pulse energies selected from the threshold for structural change to some factor times that threshold, so as to produce voxels in the bulk of said transparent storage medium.

27. The invention of claim 4, wherein said material has a focusing-dependent energy threshold for structural change, and wherein said writing step is accomplished by focusing optics having a numerical aperture greater than or equal to about 0.5, by pulse widths selected from the range of a few femtoseconds to less than about two hundred (200) picoseconds, and by pulse energies selected to be above the threshold for structural change by greater than about a factor of five (5) times that threshold, so as to produce structures in the bulk of said transparent storage medium.

28. The invention of claim 4, wherein said material has a focusing-dependent energy threshold for structural change, and wherein said writing step is accomplished by optics having a numerical aperture less than about 0.5, by pulse widths selected from the range of pulse widths from a few femtoseconds to less than about two hundred (200) picoseconds, and by pulse energies selected to be above the focusing-dependent threshold.

29. The invention of claim 4, wherein said information elements are each written sequentially to another location in said bulk of said transparent storage medium.

30. The invention of claim 4, wherein said information elements are each written simultaneously to another location in said bulk of said transparent storage medium.

31. The invention of claim 4, further including the step of optically reading said crack-free and regularly shaped structures in the bulk of said transparent storage medium.

32. A digital optical information storage and retrieval system, comprising:
a transparent, solid storage medium having an interior region defining a bulk comprised of a plurality of locations where binary information is to be written and having an energy threshold for structural change in the bulk;
means for providing a laser write beam substantially transparent to said transparent, solid storage medium;
means for focusing the laser write beam along a path to a point inside of said interior region where information is to be written;
means for so displacing said point as to cause it to coincide with different ones of said locations of said interior region where binary information is to be written inside of said interior region of said transparent, solid storage medium;
means coupled to the laser write beam and responsive to binary information to be written and cooperative with said displacing and said focusing means for delivering energy by said beam that is above said energy threshold for structural change in the bulk producing a plasma at each said location that acts to fabricate a permanent sub-micron-diameter voxel of high-contrast refractive index at each said location in said interior region of said transparent, solid storage medium that is representative of said binary information; and
optical means for detecting said permanent sub-micron-diameter voxels formed in said interior region at said locations of said transparent, solid storage medium to read said binary information.

33. The invention of claim 32, wherein said displacing means is coupled to said write beam means and to said focusing means for controllably displacing said transparent, homogenous-solid storage medium and said laser write beam relatively to each other such that said point coincides with different ones of said locations.

34. The invention of claim 32, wherein said displacing means includes a reflector and a two-degree of freedom actuator.

35. The invention of claim 32, wherein said means for focusing focuses said laser write beam along said optical path in a focal region defined about each said point, where said focal region about each said point is characterized by a waist of preselected extent defined transversely to said optical path and centered at each said point that is selected to control the transverse extension of said voxels to be fabricated, and by a Rayleigh length of preselected extent defined longitudinally to said optical path and centered at each said point that is selected to control the longitudinal extension of said voxels to be fabricated.

36. The invention of claim 32, wherein said detecting means provides parallel read-out.

37. The invention of claim 36, wherein said detector means includes a scattered light mode microscope.

38. The invention of claim 36, wherein said detector means includes a phase contrast microscope.

39. The invention of claim 32, wherein said detecting means provides parallel read-out.

40. The invention of claim 39, wherein said detector means includes a confocal microscope.

41. The invention of claim 39, wherein said detector means includes a DIC microscope.

42. The invention of claim 36, wherein includes a transmitted light mode microscope.

43. A method for sub-surface engraving of transparent solids having a bulk and an energy threshold for structural change in the bulk, comprising the steps of:
choosing a whole pattern to be engraved;
resolving the whole pattern to be engraved into a plurality of information elements each forming another part of the whole pattern to be engraved and specifying locations corresponding thereto in the bulk of the transparent solid to be engraved; and
so focusing ultrashort pulses of laser light inside the bulk of the transparent solid of energy above said energy threshold for structural change in the bulk as to produce a plasma therewithin that acts to write each information element at another location as a permanent structure of high-contrast refractive index having regularly-shaped walls in the bulk of the transparent solid free of cracks in the bulk about each said permanent structure.

44. The invention of claim 43, wherein said whole pattern is written in 2-D in the bulk of the transparent solid.

45. The invention of claim 43, wherein said whole pattern is written in 3-D in the bulk of the transparent solid.

* * * * *